Patented Sept. 12, 1950

2,521,676

UNITED STATES PATENT OFFICE 2,521,676

PHOSPHORUS PENTOXIDE IN PHOSPHORIC ACID FOR THIOXANTHONE RING CLOSURE

Wilhelm Schmidt-Nickels, Little York, N. J., assignor to General Aniline & Film Corporation, New York, N. Y., a corporation of Delaware No Drawing. Application December 16, 1948, Serial No. 65,724

8 Claims. (Cl. 260—328)

This invention relates to an improved process for cyclicizing an anthraquinone-thiophenyl ether containing a carboxylic acid group to the corresponding thioxanthone.

Heretofore, the formation of such thioxanthone ring systems was usually carried out by the use of phosphorus pentachloride. The handling of phosphorus pentachloride causes great difficulties in the production of the compounds. Concentrated sulfuric acid cannot be used for these ring closures as it gives undesirable side reactions, such as sulfonation.

It is therefore an object of the present invention to provide a new process to cyclicize an anthraquinone-thiophenyl ether containing a carboxylic acid group to the corresponding thioxanthone while avoiding the difficulties inherent in prior procedures.

It is a further object of the present invention to provide a new process to cyclicize an anthraquinone-thiophenyl ether containing a carboxylic acid group to the corresponding thioxanthone by the use of a reagent which is easy to handle.

It is a further object of the present invention to provide a new process to cyclicize an anthraquinone-thiophenyl ether containing a carboxylic acid group to the corresponding thioxanthone in substantially quantitative yields.

These and other objects are attained by the present invention, wherein the cyclicization of an anthraquinone-thiophenyl ether containing a carboxylic acid group to the corresponding thioxanthone is effected by the use of a solution of phosphorus pentoxide in phosphoric acid preferably equal molar (142 parts of phosphorus pentoxide in 98 parts of phosphoric acid). In general, the reaction is carried out by heating the aforesaid carboxylic acid compound with the solution of phosphorus pentoxide in phosphoric acid to 100° to 210° C. The reaction proceeds as follows:

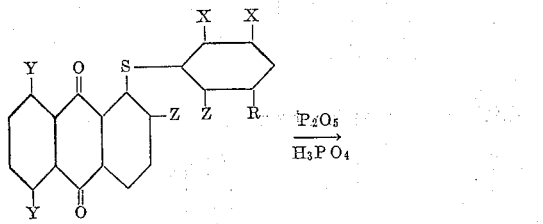

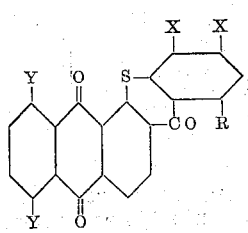

wherein R is hydrogen or a halogen, i. e., chlorine, bromine, etc.; X is hydrogen, halogen, or alkyl, i. e., methyl, ethyl, propyl, butyl, amyl, hexyl, octyl, dodecyl, stearyl, etc.; alkoxy, i. e., methoxy, ethoxy, propoxy, butyroxy, etc.; or aryloxy, i. e., phenoxy; Y is hydrogen, chloro, hydroxy or amino; and one Z is hydrogen and the other is a carboxylic acid group.

The carboxylic acid group may be either in the anthraquinone system or in the phenyl ring of the thioether and is in ring closure position, i. e., ortho to the thioether bridge. The reaction with these types of compounds may be illustrated as follows:

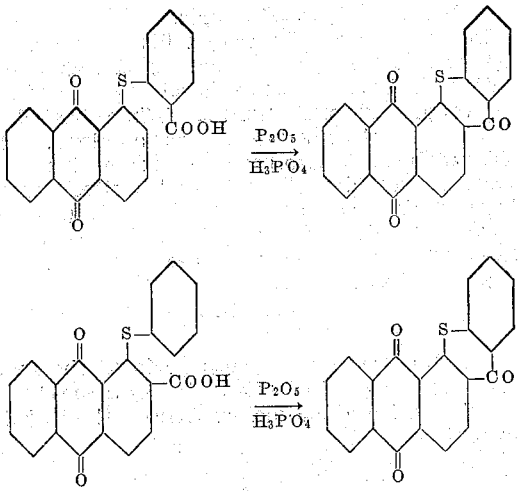

As indicated in the general formula, reactive groups such as the $NH_2$ group, halogen and the like are not affected by the phosphorus pentoxide-phosphoric acid.

As is evident the compounds, the ring closure of which is contemplated herein, are anthraquinone thiophenyl compounds bearing a carboxylic acid grouping in ortho position to the sulfur bridge, said compounds having a free position ortho to said bridge in the ring system other than that containing the carboxy group. Such compounds are embraced by the above general formula and are also illustrated supra. Additional examples of such compounds are:

anthraquinonyl-1-thiosalicylic acid.
2-carboxy-anthraquinonyl-2,5-dichlorobenzenethiol
5-amino-anthraquinonyl-1-thiosalicylic acid
5,8-diamino-anthraquinonyl-1-thiosalicylic acid
5-amino-anthraquinonyl-1-thio-5-(or 3-)chlorsalicylic acid
5-amino-2-carboxy-anthraquinonyl-1-thiobenzene
anthraquinonyl-1-thio-3-methyl salicylic acid 2-carboxy-anthraquinonyl - 2 - chloro - benzene-thiol 2-carboxy-anthraquinonyl - 3 - chloro - benzene-thiol 2-carboxy-anthraquinonyl - 4 - chloro - benzene-thiol 2-carboxy-anthraquinonyl - 4 - bromo - benzene-thiol The following examples are illustrative of the present invention but are not to be construed as limiting the invention.

Example 1

Two hundred parts of anthraquinonyl-1-thiosalicylic acid (obtained from 1-chloroanthraquinone and thiosalicylic acid) were introduced with stirring into 2000 parts of an equal molar solution of $P_2O_5$ in $H_3PO_4$. The mixture was heated up to 160° C. for 20 minutes. The mass was then poured into 20,000 parts water, stirred for ½ hour, filtered and washed with water. The wet presscake was introduced into 5000 parts water, 135 parts by volume of 20% sodium hydroxide solution and 200 parts by volume of sodium hypochlorite solution. The suspension was boiled for 10 hours while replacing the evaporated water from time to time. Finally the product was filtered, washed neutral and dried. Weight=169 parts.

The product can be recrystallized from nitrobenzene as follows: 160 parts of the above reaction product were introduced into 1200 parts by volume of nitrobenzene. When heated to 205° C. a clear solution was obtained. The thioxanthone crystallized at room temperature. It was filtered, washed with nitrobenzene, then with alcohol and dried. Weight=151 parts. Found: S=9.33%. Theory for $C_{21}H_{10}O_3S$: S=9.36%. The product dyed cotton orange from a violet vat.

Example 2

One hundred and seventy parts of the reaction product of 1-nitroanthraquinone-2-carboxylic acid and 2,5-dichlorobenzenethiol of the formula:

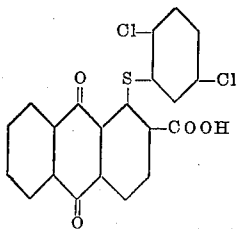

were introduced with stirring into 1700 parts of an equal molar solution of $P_2O_5$ in $H_3PO_4$. The mixture was heated to 180° C. and stirred at 180° C. for 20 minutes. The charge was worked up as described in Example 1. The product was pure enough for all technical purposes without recrystallization. The weight obtained after hypo bleaching was 144 parts. The product dyed cotton yellow from a violet vat.

Example 3

One hundred and seventy parts of the reaction product of 1-chlor-5-aminoanthraquinone and thiosalicylic acid were introduced with stirring into 1700 parts of an equal molar solution of $P_2O_5$ in $H_3PO_4$. The mixture was heated to 200° C. and stirred at 200° C. for 20 minutes. The charge was worked up as described in Example 1. Weight obtained=159 parts.

The product is an intermediate for dyestuff syntheses. For most practical purposes it is pure enough without recrystallization or other purifications.

While the above examples are illustrative of the invention, modifications and variations will be apparent to those skilled in the art and are within the scope of the invention as defined by the appended claims.

I claim:

1. A process for forming a thioxanthone from an anthraquinone-thiophenyl ether containing a carboxylic acid group in ortho position to the sulfur ether atom, which comprises reacting said acid with phosphorus pentoxide in phosphoric acid.

2. A process for forming a thioxanthone from an anthraquinone-thiophenyl ether containing a carboxylic acid group in ortho position to the sulfur ether atom, which comprises reacting said acid with an equal molar solution of phosphorus pentoxide in phosphoric acid.

3. A process for forming the corresponding thioxanthone from a compound of the following general formula:

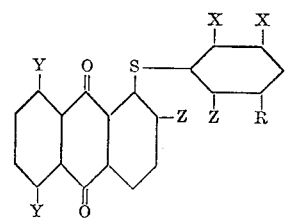

wherein R is selected from the group consisting of hydrogen and a halogen, X is selected from the group consisting of hydrogen, halogen, alkyl, alkoxy, and aryloxy, Y is selected from the group consisting of hydrogen and an amino group and one Z is hydrogen and the other Z is a carboxylic acid group; which comprises heating said compound in the presence of a mixture of phosphorus pentoxide in phosphoric acid.

4. A process for forming:

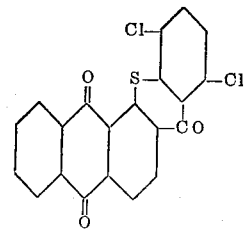

which comprises heating:

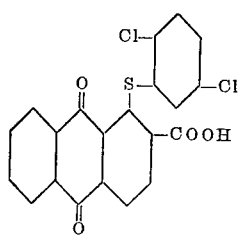

in the presence of a mixture of phosphorus pentoxide and phosphoric acid.

5. A process for forming:

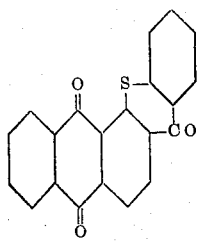

which comprises heating:

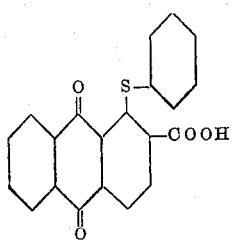

in the presence of a mixture of phosphorus pentoxide and phosphoric acid.

6. A process for forming:

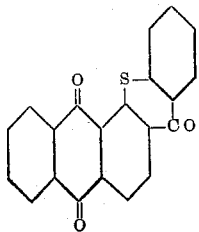

which comprises heating:

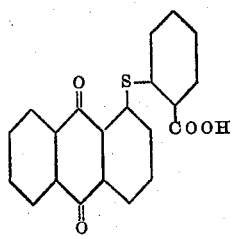

in the presence of a mixture of phosphorus pentoxide and phosphoric acid.

7. A process for forming:

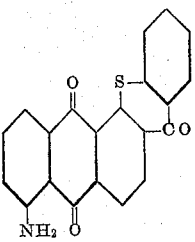

which comprises heating:

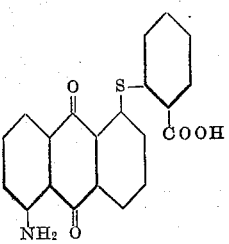

in the presence of a mixture of phosphorus pentoxide and phosphoric acid.

8. A process for forming a thioxanthone from an anthraquinone-thiophenyl ether containing a carboxylic acid group in ortho position to the sulfur ether atom, which comprises mixing said acid with a mixture of phosphorus pentoxide in phosphoric acid, heating the mixture to a temperature in the range 100° to 210° C. and washing the product with water.

WILHELM SCHMIDT-NICKELS.

REFERENCES CITED

The following references are of record in the file of this patent:

UNITED STATES PATENTS

| Number | Name | Date |
|---|---|---|
| 1,880,490 | Rosch | Oct. 4, 1932 |

FOREIGN PATENTS

| Number | Country | Date |
|---|---|---|
| 402,741 | France | Sept. 7, 1909 |

OTHER REFERENCES

Behr, Berichte, 7, 578–579 (1875).